United States Patent
Lai et al.

(10) Patent No.: US 8,395,336 B2
(45) Date of Patent: Mar. 12, 2013

(54) CONTROL SYSTEM OF THREE PHASE INDUCTION MOTOR DRIVER AND FIELD WEAKENING CONTROL METHOD THEREOF

(75) Inventors: Yen-Shin Lai, Taipei (TW); Ping-Yi Lin, Taipei (TW)

(73) Assignee: National Taipei University of Technology, Taipei (TW)

( * ) Notice: Subject to any disclaimer, the term of this patent is extended or adjusted under 35 U.S.C. 154(b) by 371 days.

(21) Appl. No.: 12/846,345

(22) Filed: Jul. 29, 2010

(65) Prior Publication Data

US 2012/0025749 A1 Feb. 2, 2012

(51) Int. Cl.
 *H02P 21/00* (2006.01)
(52) U.S. Cl. .................. 318/400.02; 318/602
(58) Field of Classification Search .................. 318/727, 318/400.02, 602, 798, 799, 800, 801
See application file for complete search history.

(56) References Cited

U.S. PATENT DOCUMENTS

| | | | | |
|---|---|---|---|---|
| 5,811,957 A * | 9/1998 | Bose et al. | ..................... | 318/802 |
| 6,031,738 A * | 2/2000 | Lipo et al. | ........................ | 363/37 |
| 6,784,634 B2 * | 8/2004 | Sweo | ............................. | 318/727 |
| 7,095,209 B2 * | 8/2006 | Thunes et al. | ................ | 318/825 |
| 7,294,988 B2 * | 11/2007 | Ajima et al. | .................. | 318/712 |

FOREIGN PATENT DOCUMENTS

| | | |
|---|---|---|
| TW | 084113378 | 12/1998 |
| TW | 094120978 | 3/2010 |

* cited by examiner

*Primary Examiner* — Rina Duda
(74) *Attorney, Agent, or Firm* — Muncy, Geissler, Olds & Lowe, PLLC (57) ABSTRACT

A control system of a three phase induction motor driver and a field weakening control method. The control system includes a driver control module, a field weakening control module, an AC power source, a power loop module, a current sensing module, and an AC motor module. A switching period of an inverter PWM control is used for the AC motor and an inverter control thereof to analyze and obtain the difference value of the sum of effective switching times. The field weakening control module generates an adaptive magnetizing current command in real time to achieve a maximum utilization of a DC link voltage so as to let the AC motor module achieve maximum output torque under different field weakening regions of different speeds when a rated speed is exceeded.

17 Claims, 8 Drawing Sheets

CONTROL SYSTEM OF THREE PHASE INDUCTION MOTOR DRIVER AND FIELD WEAKENING CONTROL METHOD THEREOF

BACKGROUND OF THE INVENTION

1. Field of the Invention

A traditional three phase AC induction motor generates a stator current to induce a magnetic flux on the q-axis, then uses the magnetic flux to interact with the magnetic flux induced by the rotor current on the d-axis to implement vector control of the three phase AC induction motor. The back EMF generated by the three phase AC induction motor is proportional to the speed. Therefore, when the voltage provided by the DC link capacitor is not enough to overcome the back EMF generated by the three phase AC induction motor when the speed increases, the high speed range of the three phase AC induction motor is limited. In order to solve the problem and to allow the three phase AC induction motor to operate with a higher speed, generally, the driver would adjust the d-axis current to reduce the rotor magnetic flux, thereby decreasing the back EMF and improving the speed range. This method is well known as field weakening control.

However, in the prior art field weakening principle (such as Taiwan patent application no. 084113378 titled "Method for adjusting parameters in vector controlled inverter"), a command inversely proportional to the d-axis rotor magnetic flux or current value is generated, but conditions such as the maximum output voltage of the driver and the rated current for the motor are not taken into consideration. Therefore, there is no guarantee that the maximum utilization of the DC link voltage and the maximum output torque can be obtained.

Additionally, another prior art field weakening principle (such as Taiwan patent application no. 094120978 titled "method for controlling the induced EMF") calculates the value of the back EMF to determine whether the motor speed exceeds the rated speed and to implement field weakening method accordingly. However, it takes a lot of complicated mathematical operations to do this, and the mathematic expressions could be affected by the variation of the motor parameters. Therefore, this prior art field weakening principle (such as Taiwan patent application no. 094120978 titled method for controlling the induced EMF) can not reach the maximum output torque. Besides, prior art techniques do not take into consideration the condition that the three phase AC induction motor has the maximum pull-out torque under maximum slip speed. In other words, prior art techniques are not applicable when the motor is operated in a second field weakening region of a much higher speed.

Therefore, the traditional three phase AC induction field weakening control method presents some shortcomings to be overcome.

In view of the deficiencies of the prior art techniques, a control system is proposed, of a three phase induction motor driver and a field weakening control method thereof in the present invention.

SUMMARY OF THE INVENTION

It is an object of the present invention to provide a control system of a three phase induction motor driver and a field weakening control method thereof, so that when the three phase AC induction motor exceeds the rated speed, it is possible to detect whether the motor is in a first field weakening region or a second field weakening region of a higher speed, to achieve maximum utilization of the DC link voltage.

It is another object of the present invention to provide a control system of a three phase induction motor driver and a field weakening control method thereof, so that the present invention is applicable under different speeds of different field weakening regions and can provide the maximum output toque to solve the problems and possible deficiencies of the prior art techniques.

In order to achieve the above objects, the present invention discloses a control system of a three phase induction motor driver and a field weakening control method thereof, wherein the control system comprises a driver control module, a field weakening control module, an AC power source, a power loop module, a current sensing module, and an AC motor module. The present invention uses a switching period of an inverter PWM control for the AC motor and an inverter control thereof to analyze and obtain the difference value of the sum of effective switching times ($T_A+T_B$), and the field weakening control module generates an adaptive magnetizing current command (the modified value of d-axis current command) in real time to achieve a maximum utilization of a DC link voltage so as to let the AC motor module achieve maximum output torque under different field weakening regions of different speeds when a rated speed is exceeded.

The present invention also discloses a method using a space vector modulation principle (effective switching times of effective voltage vectors $T_A$, $T_B$) to analyze if the maximum DC link capacitor voltage is used, when $T_A+T_B=T_Z$, where $T_Z$ equals to the switching period of PWM control (the reference command when the maximum utilization of the DC link capacitor voltage is reached), which means the utilization of the DC link capacitor voltage is at its maximum. Furthermore, in order to further increase the speed of the motor, it is necessary to meet the condition of $T_A+T_B=T_Z$ and to use the field weakening technique to achieve the object.

Besides, when $T_A+T_B=T_Z$, the voltage vector value is larger than that in the linear region, which means the trajectory of the inverter output voltage vector is on the maximum hexagon perimeter, so that when the stator current is limited by the rated current, the three phase AC induction motor is operating under the maximum voltage and current. When the condition is met, the three phase AC induction motor operating in the first field weakening region would have the maximum output torque.

As the speed increases and the slip speed of the three phase AC induction motor reaches the maximum slip speed, which means the three phase AC induction motor is operating in the second field weakening region. Therefore, if the motor is operating with the maximum voltage and reaches the maximum current under the maximum slip speed condition, the three phase AC induction motor operating in the second field weakening region would have the maximum output torque.

DETAILED DESCRIPTION OF THE PREFERRED EMBODIMENT

Figure 1A:
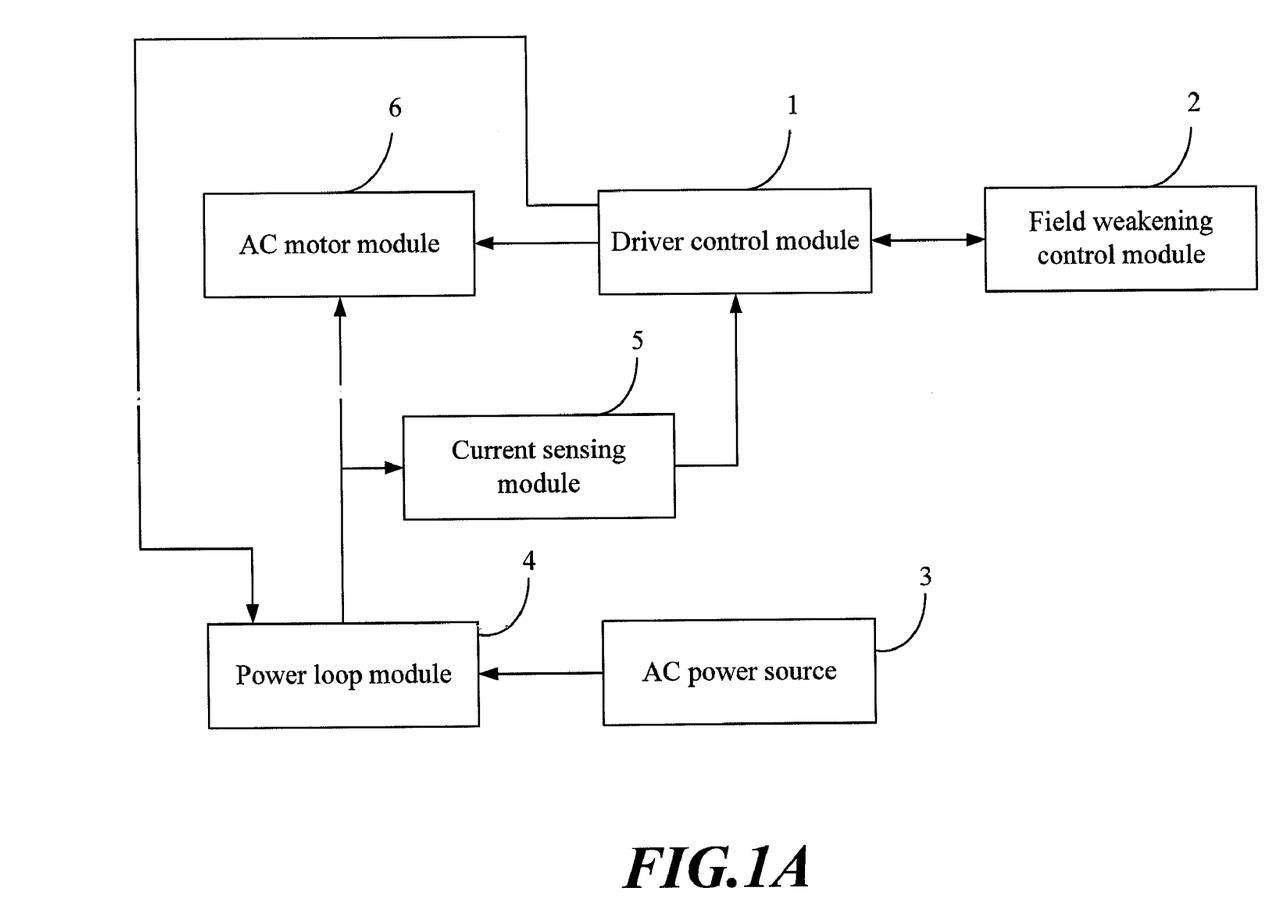
FIG. 1A illustrates a structural view of a control system of a three phase induction motor driver and a field weakening control method thereof in the present invention.
Figure 1B:
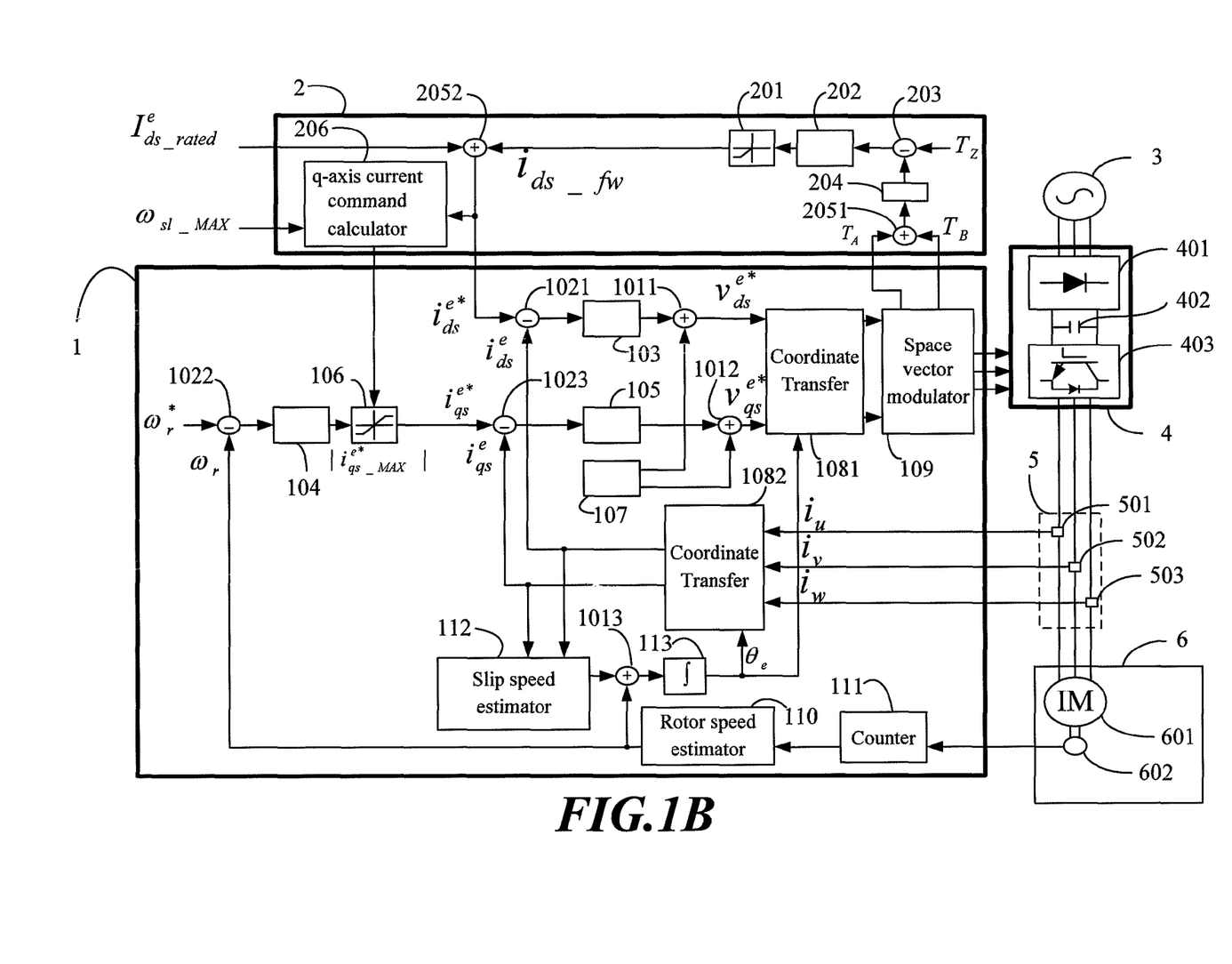
FIG. 1B illustrates a circuit diagram of the control system of the three phase induction motor driver and the field weakening control method thereof in the present invention.

Please refer to FIG. 1A and FIG. 1B for a structural view and a circuit diagram of a control system of a three phase induction motor driver and a field weakening control method thereof in the present invention.

The system includes, a driver control module 1 coupled with a field weakening control module 2, a power loop module 4, a current sensing module 5 and an AC motor module 6. The driver control module 1 comprises adders 1011,1012, 1013, subtractors 1021, 1022, 1023, a d-axis current controller 103, a speed controller 104, a q-axis current controller 105, a limiter 106, a voltage decoupling compensator 107, coordinate transfers 1081, 1082, a space vector modulator 109, a rotor speed estimator 110, a counter 111, a slip speed estimator 112, and an integrator 113. The driver control module 1 uses an encoder 602 to obtain position information of the AC motor module.

A field weakening control module 2 is coupled with the driver control module 1, and includes a limiter 201 for limiting a modified value of the flux current command to be negative and preventing the d-axis rotor magnetic flux or the d-axis current of the three phase AC induction motor from being less than zero or close to zero; a field weakening current controller 202 for generating the modified value of the flux current command; a subtractor 203 for subtracting the sum of the filtered effective switching times ($T_A+T_B$) from the switching period $T_Z$; a low pass filter 204 for filtering out the high frequency signal of the sum of the filtered effective switching times ($T_A+T_B$); adders 2051,2052. adder 2051 for adding the effective switching time $T_A$ and $T_B$ of effective voltage vectors defined in the space vector modulation principle, adder 2052 for adding the modified value of d-axis current command $i_{ds\_fw}$ and d-axis rated current $I_{ds\_rated}^e$ to obtain a real d-axis current command reference value $i_{ds}^{e*}$; and a maximum q-axis current command calculator 206 for analyzing and calculating the maximum value of the q-axis current command.

The field weakening control module 2 passes the sum of the effective switching times ($T_A+T_B$) of the effective voltage vectors of the space vector modulator 109 through the low pass filter 204 to filter out the high frequency signal. Then the field weakening control module 2 has the sum of the filtered effective switching times ($T_A+T_B$) subtracted from the switching period $T_Z$ of the PWM control to make a comparison, then uses the field weakening current controller 202 for adjustment. Besides, the limiter 201 is implemented to make sure that when $T_A+T_B=T_Z$, the output of the limiter 201 is a negative value $i_{ds\_fw}$ to be the modified value of the d-axis current command (thereby preventing the d-axis rotor magnetic flux or the d-axis current from being less than zero or close to zero due to the adjustment of the field weakening current controller). Afterwards the adder 2052 adds the output of the limiter 201 with the d-axis rated current $I_{ds\_rated}^e$ to obtain a real d-axis current command reference value $i_{ds}^{e*}$.

The AC power source 3 is coupled with the power loop module 4 to act as a input power source.

The power loop module 4 is coupled with the driver control module 1, the AC power source 3, the current sensing module 5, and the AC motor module 6. The power loop module 4 comprises a rectifying module 401 (which can accept a single phase or a three phase power source), a DC link capacitor 402 (acting as the input of the inverter module) and the inverter module 403 (comprising a switch element which can provide three phase pulse voltage output and is connected with the input side of the three phase AC induction motor. The switch element is switched by a driving signal generated by the driver control module 1). Therefore, when the utility power is fed through the AC power source 3, the rectifying module 401 rectifies the AC power into a DC power with ripples, then the DC link capacitor 402 filters the DC power, and the space vector modulator 109 outputs a control signal to the inverter module 403 to drive the switch element for transferring the DC energy.

A current sensing module 5 comprises three current sensors 501, 502, 503, and the current sensing module 5 is coupled with the driver control module 1, the power loop module 4, and the AC motor module 6 and is responsible for the feedback of three phase currents iu, iv, and iw of the motor.

The AC motor module 6 is coupled with the driver control module 1, the power loop module 4, and the current sensing module 5. The AC motor module 6 comprises the three phase AC induction motor 601 and the encoder 602 (both coupled with the same shaft), wherein the encoder 602 can be a incremental encoder. The driver control module 1 uses the rotor position and/or speed provided by the encoder 602 to generate a stator current on the q-axis via the speed controller 104. Therefore, a vector control of the three phase AC induction motor is achieved by interacting a magnetic flux induced by the stator current on the q-axis with the magnetic flux induced by the rotor current on the d-axis of the three phase AC induction motor.

The driver control module 1 uses the counter 111 to convert a pulse information of the encoder 602 into a rotor angle of the AC motor. The rotor speed estimator 110 uses the rotor angle to calculate the speed of the motor. Therefore, the motor speed can also be provided as a feedback information for the speed controller 104, the adder 1013 adds the motor speed and the slip speed (the slip speed estimator 112 uses the d-axis current, and q-axis current to obtain the slip speed, wherein the d-axis current value is determined by the field weakening control structure, and the maximum current constraints are determined by different limitations of q-axis currents in different field weakening regions) to obtain a sum, which is processed by the integrator 113 to obtain a synchronous rotating angle.

The synchronous rotating angle is used by the coordinate transfers 1081, 1082 for transferring coordinates. When the current sensors 501, 502, 503 feedback the three phase current iu, iv, iw of the motor and convert variables of three phase stationary coordinates into variables of two phase synchronous rotating coordinates $i_{ds}^e$ and $i_{qs}^e$, the variable are fed to the subtractors 1021, 1023 to be subtracted from the current command, and the subtraction result is used by the d-axis current controller 103 and q-axis current controller 105 for adjustment, then the outputs of the two current controller (d-axis current controller 103 and q-axis current controller 105) are compensated by the compensation value (adder 1011, 1012) of the voltage decoupling compensator 150. Based on the compensated outputs, the variables of the two phase synchronous rotating coordinate are converted by the coordinate transfer 1081 to obtain the voltage space vector command of the space vector modulator 109.

Under a normal speed mode, the speed $\omega_r$ and the speed command $\omega^*_r$ of the three phase AC induction motor are fed to the subtractor 1022 and adjusted by the speed controller 104. The output of the speed controller 104 is coupled to the limiter 106 to act as a limit for the q-axis current command and the output torque. The limit value of the limiter can be obtained by the maximum q-axis current command calculator 206. The limit value is used for preventing the driver or the motor from operating over the rated current and for limiting the maximum current values for different field weakening region.

Figure 2A:
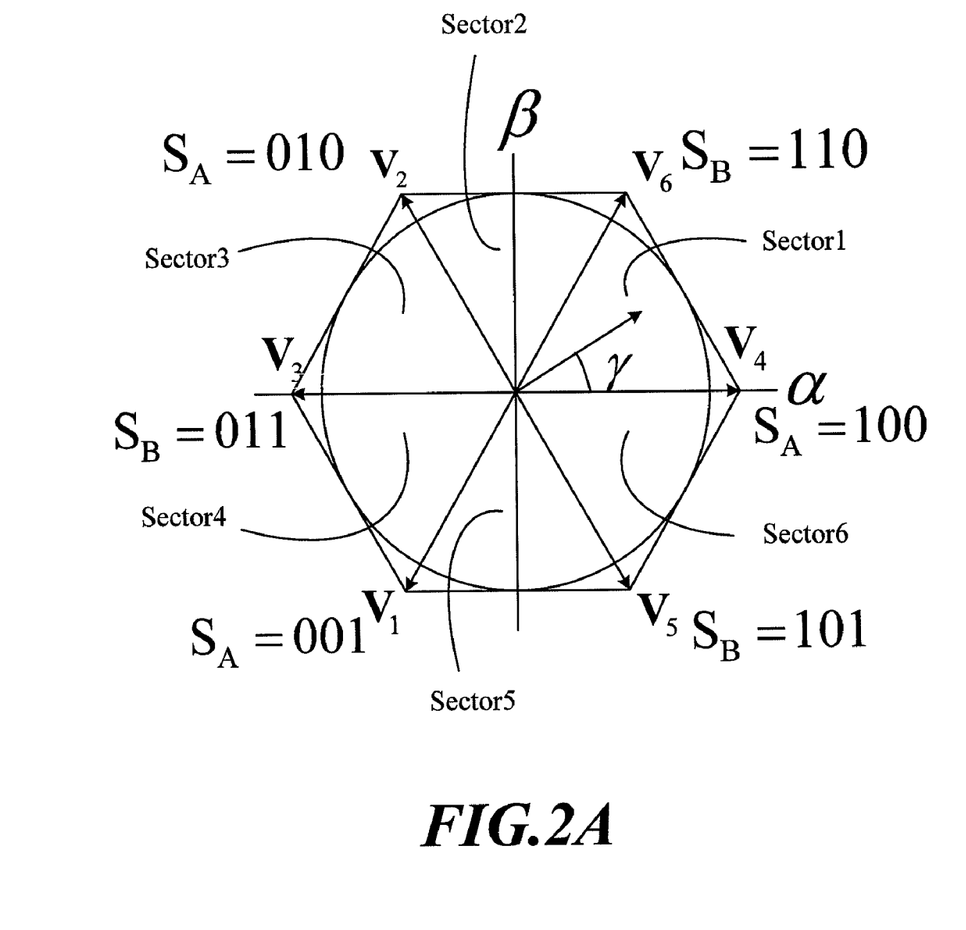
FIG. 2A illustrates a voltage space vector diagram of the control system of the three phase induction motor driver and the field weakening control method thereof in the present invention.
Figure 2B:
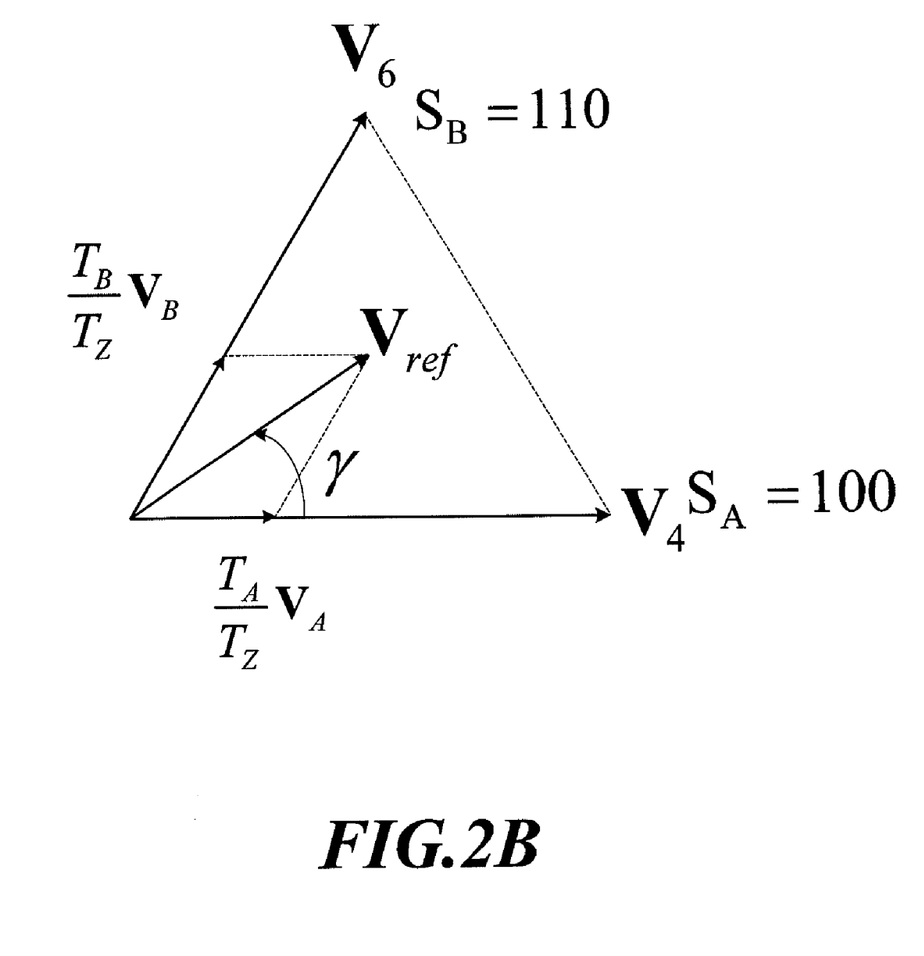
FIG. 2B illustrates a combined voltage vector diagram of the control system of the three phase induction motor driver and the field weakening control method thereof in the present invention.
Figure 2C:
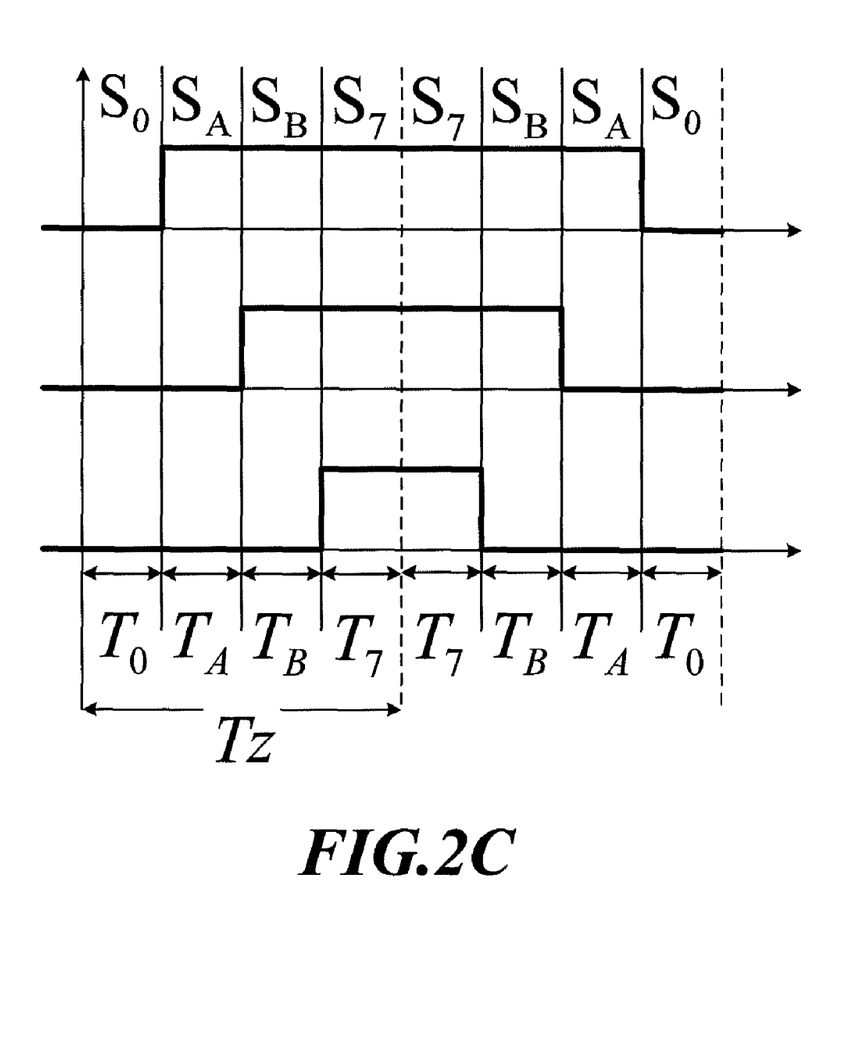
FIG. 2C illustrates a pulse diagram for space vector modulation of the control system of the three phase induction motor driver and the field weakening control method thereof in the present invention.

Please refer to FIG. 2A, FIG. 2B and FIG. 2C for a voltage space vector diagram, a combined voltage vector diagram, and a pulse diagram of the control system of the three phase induction motor driver and the field weakening control method thereof in the present invention. FIG. 2A illustrates the relation between the voltage space vector command and the sector. The relation shows the maximum limitation range and the maximum linearity range for the voltage vectors of the space vector modulation principle; when $T_A+T_B=T_Z$, which means the voltage vectors are rotating on the hexagon perimeter, so the voltage utilization is larger than that in the maximum linearity range.

FIG. 2B illustrates a view of the voltage space vector in the sector 1. In FIG. 2B, the switching timing of the synthesis voltage vector and the $T_A$, $T_B$, and $T_Z$, wherein the $T_A$ and $T_B$ are effective switching times, $T_Z$ is the switching period of the PWM control, and $T_Z=1/(KT_s)$, Ts is the sampling period of the PWM control, K is a constant.

Figure 3:
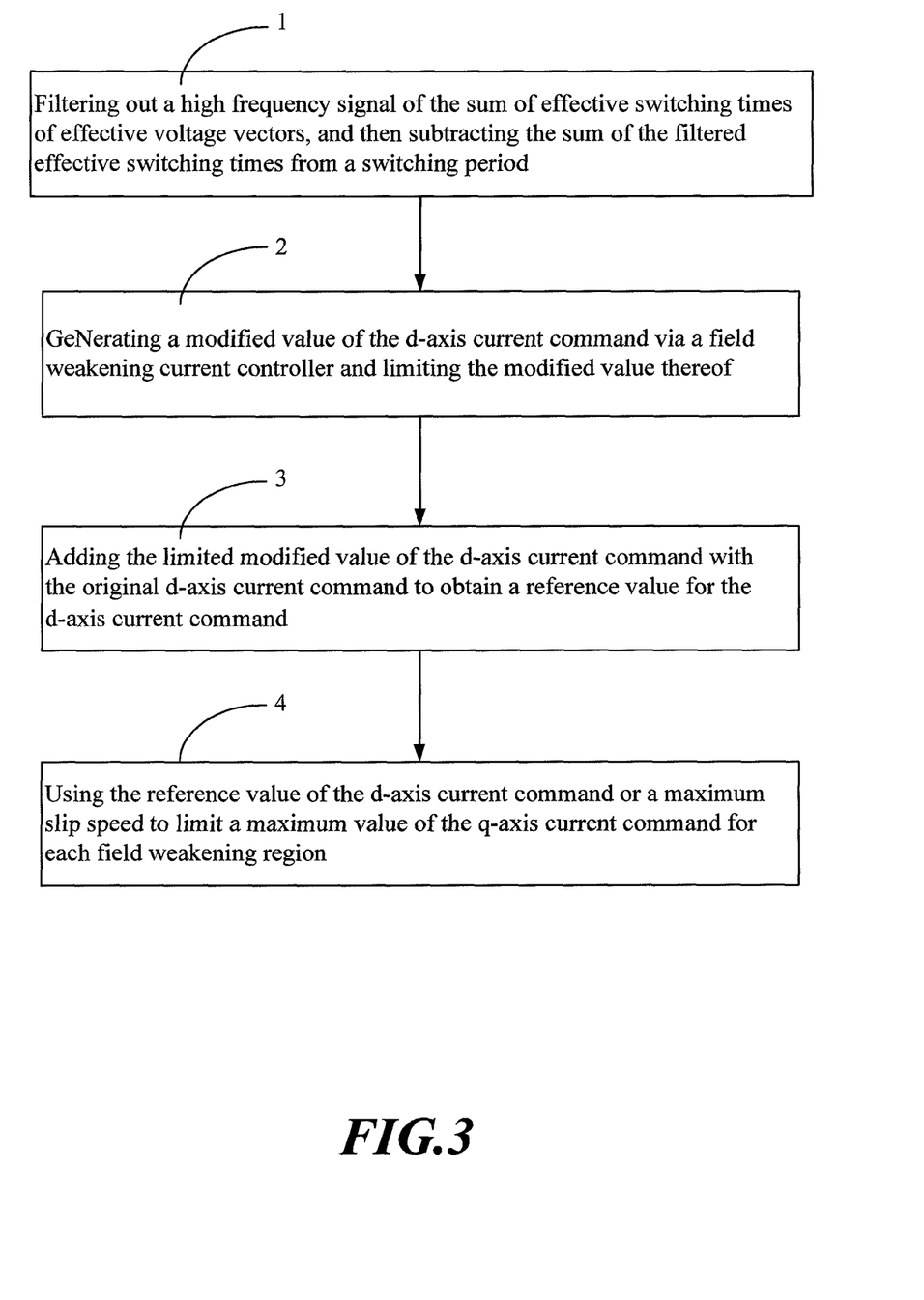
FIG. 3 illustrates a field weakening control method flowchart of the control system of the three phase induction motor driver and the field weakening control method thereof in the present invention.

Please refer to FIG. 3 for a field weakening control method flowchart of the control system of the three phase induction motor driver and the field weakening control method thereof in the present invention. The steps of the method include step1: filtering out a high frequency signal of the sum of effective switching times $(T_A+T_B)$ of effective voltage vectors, and then subtracting the sum of the filtered effective switching times $(T_A+T_B)$ from a switching period $T_Z$; step2: generating a modified value of the d-axis current command via a field weakening current controller and limiting the modified value thereof; step3: adding the limited modified value of the d-axis current command with the original d-axis current command $I_{ds\_rated}^e$ (using the limiter to ensure that when $T_A+T_B=T_Z$, the output of the limiter is a negative value $i_{ds\_fw}$ to act as the modified value of the d-axis current command, wherein the modified value of the d-axis current command generated by the field weakening current control module is used for preventing the d-axis rotor magnetic flux or the d-axis current of the three phase AC induction motor from being less than zero or close to zero) to obtain a reference value for the the d-axis current command $i_{ds}^{e*}$; and step4: using the reference value of the d-axis current command $i_{ds}^{e*}$ or a maximum slip speed $\omega_{sl\_MAX}$ to limit a maximum value of the q-axis current command for each field weakening region (the calculation of the maximum q-axis current command differs in different field weakening regions).

Figure 4:
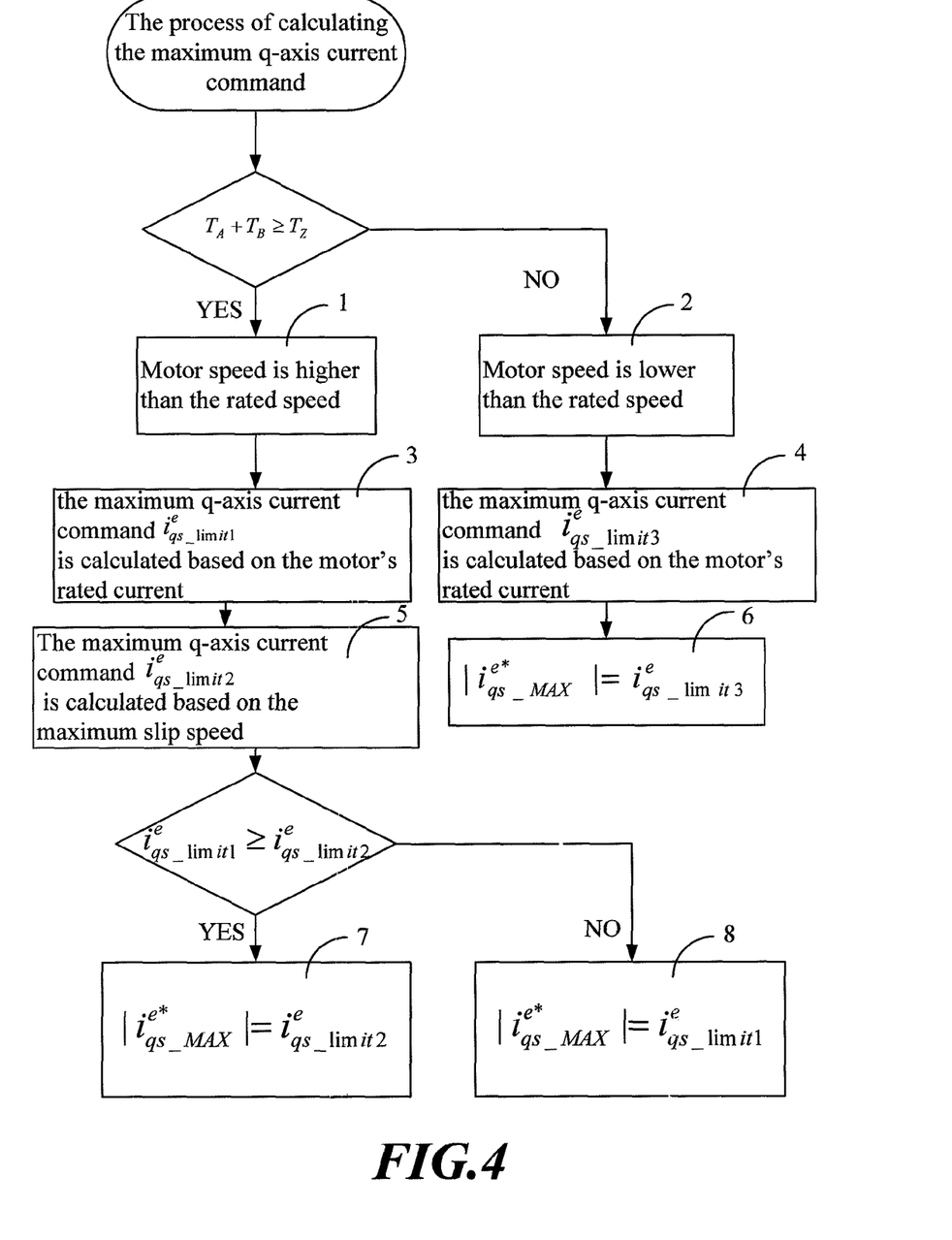
FIG. 4 illustrates a implementation flowchart of a maximum q-axis current command calculator of the control system of the three phase induction motor driver and the field weakening control method thereof in the present invention.

Please refer to FIG. 4 for an implementation flowchart of a maximum q-axis current command calculator of the control system of the three phase induction motor driver and the field weakening control method thereof in the present invention. The steps include determining whether the sum of the effective switching times $(T_A+T_B)$ of the effective voltage vectors is larger or equal to the switching period $(T_Z)$ of the PWM control, which is implemented as follows:
(1) please refer to block1, if $(T_A+T_B)$ is larger or equal to $(T_Z)$, then the motor speed exceeds the rated speed;
(2) please refer to block2, if $(T_A+T_B)$ is smaller to $(T_Z)$, then the motor speed is lower than the rated speed (at this time the motor operates in the constant torque region, and the maximum q-axis current command is determined by the rated current of the motor, which equals to $i_{qs\_limit3}^e$, please refer to block4,6); when the motor speed exceeds the rated speed, first obtain the maximum q-axis current command (determined by the motor's rated speed) as $i_{qs\_limit1}^e$, and then obtain the maximum q-axis current command as $i_{qs\_limit2}^e$ (determined by the maximum slip speed), please refer to block3,5; then determine the q-axis current command in the field weakening region under different conditions:
(1) please refer to block7, if $i_{qs\_limit1}^e$ is larger or equal to $i_{qs\_limit2}^e$, which means the limit value of the present q-axis current command is determined by the maximum slip speed (which means the motor is operating in the second field weakening region, so the maximum q-axis current command is $i_{qs\_limit2}^e$);
(2) please refer to block8, if $i_{qs\_limit1}^e$ is smaller than $i_{qs\_limit2}^e$, which means the limit value of the present q-axis current command is determined by the rated current (which means the motor is still operating in the first field weakening region, so the maximum q-axis current command is $i_{qs\_limit1}^e$).

Figure 5:
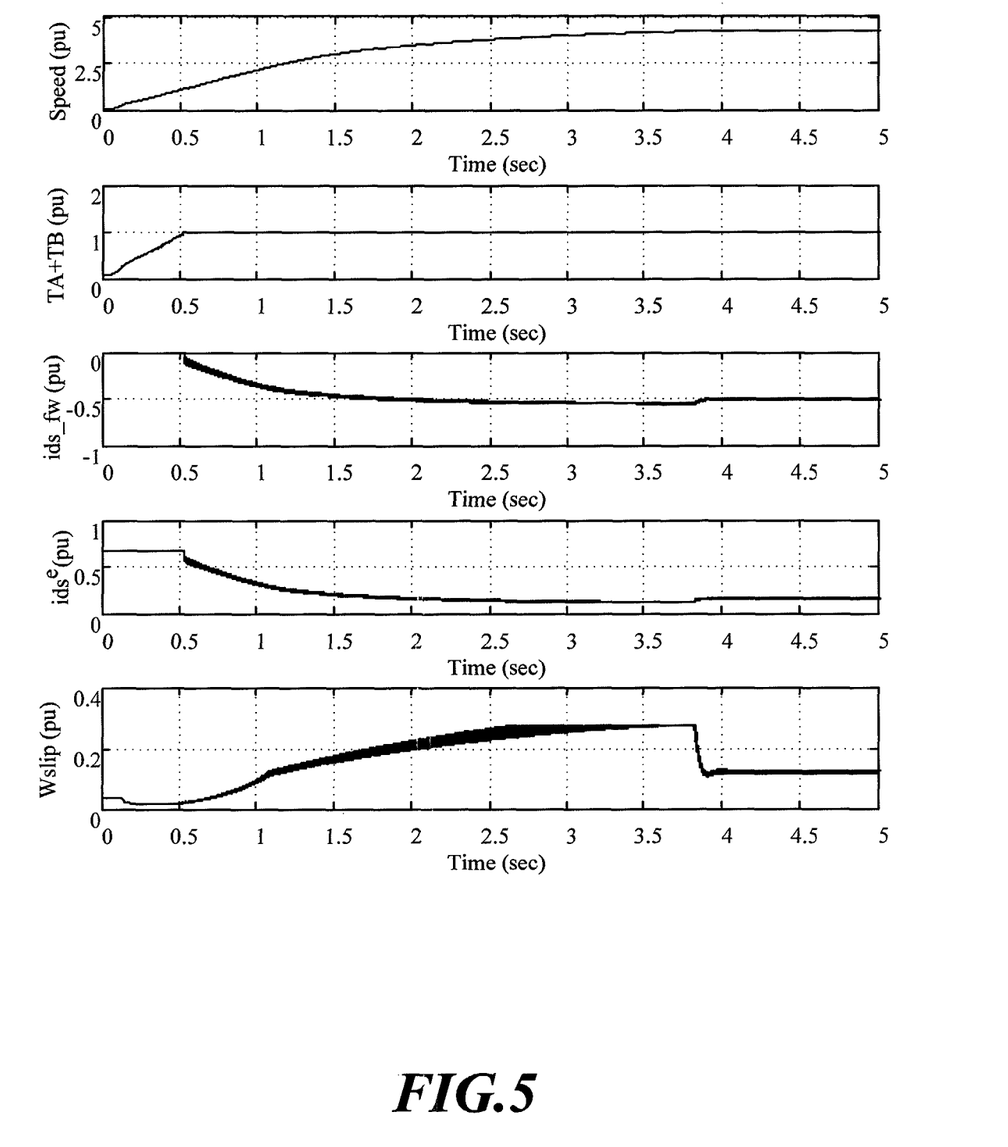
FIG. 5 illustrates a simulation result diagram of the control system of the three phase induction motor driver and the field weakening control method thereof in the present invention.

Please refer to FIG. 5 for a simulation result diagram of the control system of the three phase induction motor driver and the field weakening control method thereof in the present invention. When the rotor speed of the three phase AC induction motor reaches the rated speed (1.0 pu), $T_A+T_B$ increases to be equal to $T_Z$ (1.0 pu), the field weakening control starts, that is, the motor operates in region 1.

From the figure, the modified value $i_{ds\_fw}$ of the d-axis current command decreases as the speed goes up, and the d-axis current $i_{ds}^e$ begins to drop as the speed increases, so it is possible to retain the maximum voltage utilization of the DC link capacitor and to offset the increasing amount of the back EMF of the AC motor. When the speed is stabilized, the back EMF remains the same, and the d-axis current $i_{qs}^e$ will be stabilized as well.

As the speed continues to increase, the maximum q-axis current is limited by the maximum slip speed. From the figure, it is observed that the speed is limited by the maximum slip speed for a segment of the diagram, which means the motor is operating in the second field weakening region and the motor speed is even higher.

The present invention discloses a control system of a three phase induction motor driver and a field weakening control method thereof. When compared to other prior art techniques, it has other advantages.

The present invention provides a control system of a three phase induction motor driver and a field weakening control method thereof, the present invention uses a controller to generate a magnetizing current command in real time to achieve maximum utilization of the DC link voltage, so that when the three phase AC induction motor exceeds the rated speed, it is possible to detect whether the motor is in a first field weakening region or a second field weakening region of a higher speed.

The present invention provides a control system of a three phase induction motor driver and a field weakening control method thereof. The present invention is applicable under different speeds of different field weakening regions and can provide the maximum output toque to solve the problems and possible deficiencies of the prior art techniques.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A control system of a three phase induction motor driver, comprising:
   a driver control module coupled with a field weakening control module, a power loop module, a current sensing module and an AC motor module, the driver control module using an encoder of the AC motor module to obtain position information of the AC motor module;
   the field weakening control module comprising a limiter, a field weakening current controller, a subtractor, a low pass filter, an adder and a maximum q-axis current command calculator;
   an AC power source coupled with the power loop module to act as an input power source;
   the power loop module further coupled with the current sensing module, and the AC motor module;
   the current sensing module comprising three current sensors, the current sensing module being further coupled with the AC motor module for feedback of a three phase current of the AC motor;
   the AC motor module comprising a three phase AC induction motor and the encoder;
   wherein the system uses a switching period of an inverter PWM control for the AC motor and an inverter control thereof to analyze and obtain a difference value of a sum of effective switching times, and the field weakening control module generates an adaptive magnetizing current command in real time to achieve a maximum utilization of a DC link voltage so as to let the AC motor module achieve maximum output torque under different field weakening regions of different speeds when a rated speed is exceeded.

2. The control system of the three phase induction motor driver as claimed in claim 1, wherein the low pass filter of the field weakening control module is coupled with the adder and the subtractor, the low pass filter filters out a high frequency signal of the sum of the effective switching times, and wherein the sum of the effective switching times is obtained by adding the effective switching time $T_A$ and $T_B$ of effective voltage vectors defined in the space vector modulation principle.

3. The control system of the three phase induction motor driver as claimed in claim 1, wherein the subtractor is connected with the limiter and the field weakening current controller, the subtractor is provided for subtracting the sum of the filtered effective switching times $(T_A+T_B)$ from a switching period $T_Z$, the field weakening current controller generates a modified value of a flux current command, the limiter limits the modified value of the flux current command to be a negative value and prevents the d-axis rotor magnetic flux or the d-axis current of the three phase AC induction motor from being less than zero or close to zero.

4. The control system of the three phase induction motor driver as claimed in claim 1, wherein the maximum q-axis current command calculator analyzes and calculates the maximum q-axis current command.

5. The control system of the three phase induction motor driver as claimed in claim 1, wherein the driver control module comprises a second adder, a second subtractor, a d-axis current controller, a speed controller, a q-axis current controller, a second limiter, a voltage decoupling compensator, a coordinate transfer, a space vector modulator, a rotor speed estimator, a counter, a slip speed estimator, and an integrator.

6. The control system of the three phase induction motor driver as claimed in claim 5, wherein the counter is coupled with the encoder and the rotor speed estimator, the counter converts a pulse information of the encoder into a rotor angle of the AC motor, the rotor speed estimator uses the rotor angle to calculate the speed of the motor; therefore, the motor speed is provided as a feedback information for the speed controller.

7. The control system of the three phase induction motor driver as claimed in claim 5, wherein the coordinate transfer is coupled with the current sensor, the current sensor feedbacks the three phase current of the motor and uses the coordinate transfer to convert variables of a three phase stationary coordinate into variables of a two phase synchronous rotating coordinate.

8. The control system of the three phase induction motor driver as claimed in claim 5, wherein a voltage space vector command of the space vector modulator is obtained by adding an output of d-axis current controller and an output of the q-axis current controller with a compensation value of the voltage decoupling compensator, and using the coordinate transfer to convert variables of a two phase synchronous rotating coordinate into variables of a two phase stationary coordinate.

9. The control system of the three phase induction motor driver as claimed in claim 5, wherein the speed controller is coupled with the limiter and the subtractor and the limiter being provided for limiting the q-axis current command and the output torque, the speed controller being provided for adjusting a speed $\omega_r$ of the three phase AC induction motor via speed command $\omega^*_r$.

10. The control system of the three phase induction motor driver as claimed in claim 5, wherein the power loop module comprises a rectifying module, a DC link capacitor, and an inverter module, the AC power source provides an AC power, the rectifying module rectifies the AC power to output a DC power with ripples, then the DC link capacitor filters the DC power and outputs a filtered DC power to the inverter module, and the space vector modulator outputs a control signal to the inverter module to drive a switch element of the inverter module for converting the filtered DC power to obtain the DC energy.

11. The control system of the three phase induction motor driver as claimed in claim 1, wherein the encoder can be a incremental encoder, the driver uses the rotor position and/or speed provided by the encoder to generate a stator current on a q-axis via the driver control module; therefore, a vector control of the three phase AC induction motor is achieved by interacting a magnetic flux induced by the stator current on the q-axis with the magnetic flux induced by the rotor current on a d-axis of the three phase AC induction motor.

12. A field weakening control method of a three phase induction motor driver, comprising the following steps:
   1) filtering out a high frequency signal of the sum of effective switching times $(T_A+T_B)$ of effective voltage vectors, and then subtracting the sum of the filtered effective switching times $(T_A+T_B)$ from a switching period $T_Z$;

2) generating a modified value of a d-axis current command via a field weakening current controller and limiting the modified value thereof;
3) adding the limited modified value of the d-axis current command with the original d-axis current command $I_{ds\_rated}^{e}$ to obtain a reference value for the d-axis current command $i_{ds}^{e*}$; and
4) using the reference value of the d-axis current command $i_{ds}^{e*}$ or a maximum slip speed $\omega_{sl\_MAX}$ to limit a maximum value of a q-axis current command for each of a plurality of field weakening regions.

13. The field weakening control method of the three phase induction motor driver as claimed in claim 12, wherein when the modified value of the d-axis current command is generated by the field weakening current controller, a limiter is used for preventing a d-axis rotor magnetic flux or the d-axis current of the three phase AC induction motor from being less than zero or close to zero.

14. The field weakening control method of the three phase induction motor driver as claimed in claim 12, wherein the calculation of the maximum q-axis current command differs in different field weakening regions.

15. The field weakening control method of the three phase induction motor driver as claimed in claim 12, wherein the switching period of the PWM control is $T_Z=1/(KTs)$, where Ts is the sampling period of the PWM control and K is a constant.

16. The field weakening control method of the three phase induction motor driver as claimed in claim 12, wherein the maximum value of the q-axis current command obtained from the maximum slip speed can be used for determining whether a second field weakening region of the field weakening regions is reached.

17. The field weakening control method of the three phase induction motor driver as claimed in claim 12, wherein a limited value $|i_{qs\_MAX}^{e*}|$ of the q-axis current command is obtained using a rated current of the motor when the motor speed is under the rated speed, the limited value is obtained using the rated current of the motor when the motor speed exceeds the rated speed and is in a first field weakening region, and the limited value is obtained using the maximum slip speed when the second field weakening region is reached.

* * * * *